(12) United States Patent
Danger et al.

(10) Patent No.: US 8,903,013 B2
(45) Date of Patent: Dec. 2, 2014

(54) METHOD FOR SENDING PULSES IN A TRANSMISSION CHANNEL

(75) Inventors: Jean-Luc Danger, Antony (FR); Sami Mekki, Gentilly (FR); Benoît Miscopein, Grenoble (FR)

(73) Assignee: France Telecom, Paris (FR)

( * ) Notice: Subject to any disclaimer, the term of this patent is extended or adjusted under 35 U.S.C. 154(b) by 139 days.

(21) Appl. No.: 13/131,151

(22) PCT Filed: Nov. 24, 2009

(86) PCT No.: PCT/FR2009/052274
§ 371 (c)(1),
(2), (4) Date: May 25, 2011

(87) PCT Pub. No.: WO2010/061121
PCT Pub. Date: Jun. 3, 2010

(65) Prior Publication Data
US 2011/0255569 A1    Oct. 20, 2011

(30) Foreign Application Priority Data
Nov. 28, 2008   (FR) ..................... 08 58123

(51) Int. Cl.
H04L 27/00 (2006.01)
H04B 1/7163 (2011.01)
H04B 1/719 (2011.01)
H04B 1/69 (2011.01)

(52) U.S. Cl.
CPC .... *H04B 1/71637* (2013.01); *H04B 2001/6908* (2013.01); *H04B 1/71635* (2013.01); *H04B 1/719* (2013.01)
USPC ......................................................... 375/295

(58) Field of Classification Search
USPC ......................................................... 375/295
See application file for complete search history.

(56) References Cited

U.S. PATENT DOCUMENTS

2006/0140290 A1*  6/2006  Li et al. ................. 375/260
2006/0146964 A1*  7/2006  Park et al. .............. 375/341

(Continued)

FOREIGN PATENT DOCUMENTS

EP   1455461 A1   9/2004
WO   2007060749 A1   5/2007

OTHER PUBLICATIONS

English Translation of the Written Opinion dated Jun. 7, 2011 for corresponding International Application No. PCT/FR2009/052274, filed Nov. 24, 2009.
International Search Report dated Feb. 3, 2010 for corresponding International Application No. PCT/FR2009/052274, filed Nov. 24, 2009.

(Continued)

*Primary Examiner* — Tanmay Shah
(74) *Attorney, Agent, or Firm* — David D. Brush; Westman, Champlin & Koehler, P.A.

(57) ABSTRACT

A method and apparatus are provided for sending pulses from a sender device to a receiver device in a transmission channel. The pulses represent information symbols, with each of these pulses being associated with a time slot in a symbol time. The method includes a training step that is carried out before sending payload information and that includes sending a training sequence made up of two parts. A first part of the training sequence includes at least one pulse of energy that is greater than the energy of a pulse carrying payload information. There are a large number of time slots between the sending of the pulse and the sending of the next pulse. A second part of the training sequence includes a set of pulses known in advance and similar to the pulses used for carrying payload information, the energy of each of these pulses being equivalent to the energy of a pulse carrying payload information.

18 Claims, 7 Drawing Sheets

(56) References Cited

U.S. PATENT DOCUMENTS

2009/0003372 A1* 1/2009 Popper et al. .................. 370/442
2009/0296831 A1* 12/2009 Qi et al. ......................... 375/259
2011/0103430 A1* 5/2011 Witrisal ......................... 375/142

OTHER PUBLICATIONS

Written Opinion dated Feb. 3, 2010 for corresponding International Application No. PCT/FR2009/052274, filed Nov. 24, 2009.

* cited by examiner

METHOD FOR SENDING PULSES IN A TRANSMISSION CHANNEL

CROSS-REFERENCE TO RELATED APPLICATIONS

This Application is a Section 371 National Stage Application of International Application No. PCT/FR2009/052274, filed Nov. 24, 2009 and published as WO 2010/061121 on Jun. 3, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the present disclosure is that of pulse-coded communication, notably ultra-wideband (UWB) communication.

BACKGROUND OF THE DISCLOSURE

Pulse-coded communication is employed in applications involving communications over short distances at high bit rates. This applies in particular to wireless personal area networks (WPAN), networks of sensors, radio-frequency identification (RFID) systems, intrusion detection applications, etc.

The use of pulse-coded communication will grow if high bit rates can be achieved at low cost.

In the field of pulse-coded communication, the information to be sent is coded in the form of symbols.

The signal carrying these symbols is not a continuous signal but takes the form of pulses of very short duration.

Each symbol is allocated a transmission time known as the symbol time. The symbol transmission time is divided into time intervals known as frames individually carrying a pulse. Each frame is itself divided into time intervals known as slots. A symbol is thus sent in the form of a set of pulses sent individually in a particular time slot of a frame of the symbol time.

An ultra-wideband signal has certain characteristics.

The frequency band of such a signal is wide (at least 500 megahertz (MHz)). The mean power spectral density per hertz (Hz) of a UWB signal is low. For example, the American Federal Communications Commission (FCC) authorizes a mean power spectral density of the order of −41.3 decibels referenced to one milliwatt per hertz (dBm/Hz) for a signal at a frequency in the range 3.1 gigahertz (GHz) to 10.6 GHz.

There exist several methods of generating and sending a high-bit-rate pulse-coded ultra-wideband signal.

These methods include on/off modulation, which consists in showing a symbol by the absence or the presence of a pulse, and phase modulation, which consists in showing a symbol by a pulse or its complement. The modulation may also be M-ary Pulse Position Modulation (M-PPM), which consists in applying a time shift at the time of sending the pulses as a function of the value of the symbol.

Pulse-coded communication makes it possible to obtain relatively high bit rates (of the order of 480 megabits per second (Mb/s)) but requires a complex and therefore costly architecture, especially in receivers.

The complexity and cost of the architecture may be reduced by using an energy-detecting ultra-wideband receiver, but such a receiver is not suitable for high bit rates. For a high bit rate, in addition to the energy of the noise, it is necessary to take account of the energy of numerous forms of intersymbol interference caused by the transmission channel. The degraded performance caused by such interference may be attenuated if the UWB receiver includes an equalizer, especially a probabilistic equalizer. A probabilistic equalizer takes account of the distribution of the received energy at the level of the time slots of a symbol time.

A probabilistic equalizer of this kind is described by S. Mekki et al. in the document entitled "Probabilistic equalizer for ultra-wideband energy detection", IEEE 67th Vehicular Technology Conference (VTC), pp. 1108-1112, May 2008. That equalizer considers all possible combinations of interference that might exist for a finite number of symbols. That solution requires the parameters of the transmission channel to be available at the receiver in order for the receiver to effect the equalization.

In the document entitled "EM channel estimation in a low-cost uwb receiver based on energy detection", IEEE International Symposium on Wireless Communications systems 2008 (ISWCS 08), 2008, S. Mekki et al. propose a solution for estimating transmission channel parameters in the receiver from received information. That solution is based on using the expectation maximization (EM) algorithm as applied to the field of energy. The EM algorithm has the drawback of being complex at the combinatorial level. The iterations required to estimate the channel parameters generally introduce a latency time that compromises the efficacy of the system.

SUMMARY

A first aspect of the present disclosure provides a method of sending pulses from a sender device to a receiver device in a transmission channel, which pulses represent information symbols with each of these pulses being associated with a time slot in a symbol time, which method includes a training step including sending a training sequence made up of two parts:
  a first part of the training sequence including at least one pulse of energy that is greater than the energy of a pulse carrying payload information; and
  a second part of the training sequence including a set of pulses, the energy of each of these pulses being equivalent to the energy of a pulse carrying payload information.

The method of an exemplary embodiment of the invention is based on sending an independent training sequence that differs in part from payload information and therefore does not interfere with the transmission of payload information. As the training sequence differs from payload information, a set of operations may be carried out using the training sequence.

As the first part of the training sequence carries a high energy it is easily detectable by a receiver device. This first part may include a plurality of pulses, each of very high energy.

The second part of the training sequence is similar to payload information.

According to a preferred feature, the number of time slots between sending the at least one pulse of the first part of the training sequence and sending the next pulse is such that no interference is generated between the corresponding symbols.

The sending of the pulse or pulses of the first part of the training sequence is such that no interference is generated between corresponding symbols, thus enabling processing of that sequence without interference.

According to a preferred feature, the second part of the training sequence is known in advance, is similar to payload information, and generates intersymbol interference.

Since the second part of the training sequence is similar to payload information, the receiver device configuration for processing this part of the training sequence is similar to its configuration in normal operation, or even a more complex configuration, and therefore richer because of the number of interferences generated.

Another aspect of an embodiment the invention provides a method of estimating parameters of a transmission channel carrying pulses sent from a sender device to a receiver device, which pulses represent information symbols with each of these pulses being associated with a time slot in a symbol time, which method includes:

receiving a training sequence made up of two parts;
  a first part of the training sequence including at least one pulse of energy that is greater than the energy of a pulse carrying payload information;
  a second part of the training sequence including a set of pulses, the energy of each of these pulses being equivalent to the energy of a pulse carrying payload information; and
estimating parameters of the transmission channel as a function of the training sequence.

Since the training sequence includes two different parts, it is possible to effect different kinds of processing as a function of the part of the training sequence concerned.

According to a preferred feature, on reception of the first part of the training sequence, a plurality of symbols that might interfere with one another is estimated.

Since the first part of the training sequence is of very high energy, the receiver device may easily observe the impulse response of the channel and deduce from it the number of symbols that may interfere.

According to a preferred feature, on reception of the first part of the training sequence, a first estimation of energy coefficients is effected.

Since the first part of the training sequence is of very high energy and generates no interference, it makes it possible to obtain a first estimate of energy coefficients usable in very noisy transmission.

The first part of the training sequence may include a plurality of pulses so as to improve the results of the estimation effected.

According to a preferred feature, on reception of the second part of the training sequence, a first estimation of an energy level of the noise of the transmission channel is effected.

Knowing the noise makes it possible to distinguish noise in the signal from payload information.

According to a preferred feature, on reception of the second part of the training sequence, a second estimation of energy coefficients is effected.

The first estimation of energy coefficients effected on reception of the first part of the training sequence plus the knowledge of the noise makes it possible to produce a refined estimate of the energy coefficients on reception of the second part of the training sequence.

Compared to an algorithm such as the EM algorithm, using a training sequence makes it possible, with lower levels of complexity and latency, to generate an estimate of the energy coefficients that is sufficient for many applications.

According to a preferred feature, the estimation method of an embodiment of the invention includes a preliminary step of synchronizing the sender device and the receiver device, the receiver device having low amplification gain.

As the first part of the training sequence is of very high energy, synchronizing the sender and the receiver is greatly facilitated. The use of a receiver device with low amplification gain makes it possible firstly to guarantee low power consumption by the receiver device while waiting for a message, and secondly to guard against false synchronizations generated by noise. The first part of the training sequence may include a plurality of pulses so as to decrease further the probability of false synchronization.

An embodiment of the invention also provides a device for sending pulses in a transmission channel, which pulses represent information symbols with each of these pulses being associated with a time slot in a symbol time, which sender device includes means for sending a training sequence made up of two parts:
  a first part of the training sequence including at least one pulse of energy that is greater than the energy of a pulse carrying payload information; and
  a second part of the training sequence including a set of pulses, the energy of each of these pulses being equivalent to the energy of a pulse carrying payload information.

An embodiment of the invention further provides a terminal adapted to receive a sending device as described above.

An embodiment of the invention further provides a device for receiving pulses provided with a probabilistic equalizer in a transmission channel, which pulses represent information symbols with each of these pulses being associated with a time slot in a symbol time, which receiver device includes:
  means for receiving a training sequence made up of two parts:
    a first part of the training sequence including at least one pulse of energy that is greater than the energy of a pulse carrying payload information;
    a second part of the training sequence including a set of pulses, the energy of each of these pulses being equivalent to the energy of a pulse carrying payload information; and
  means for estimating parameters of the transmission channel as a function of the training sequence.

An embodiment of the invention further provides a terminal adapted to receive a receiver device as described above.

An embodiment of the invention further provides a computer program including instructions for executing a method of estimating parameters of a transmission channel as described above when the method is executed by a computer.

BRIEF DESCRIPTION OF THE DRAWINGS

Other features and advantages become apparent on reading the description of preferred implementations of a method of sending pulses in a transmission channel given with reference to the appended figures, in which.

DETAILED DESCRIPTION OF ILLUSTRATIVE EMBODIMENTS

A transmission channel supporting ultra-wideband pulse-coded communication over short distances at high bit rates is a dispersive channel, i.e. the same signal takes a plurality of different paths between a sender device and a receiver device.

There are numerous ways of modeling the propagation of a signal in an ultra-wideband channel. They include the model defined by the IEEE standard 802.15.3a, which is described in the document by J. Foerster entitled "Channel modeling subcommittee report final", IEEE P802.15-02/368r5-SG3a, Tech. Rep., 18 Nov. 2002. That model distinguishes between four types of channel: CM1 (the least dispersive), CM2, CM3, and CM4 (the most dispersive).

That model is used below to illustrate the description of implementations of a method of an embodiment of the invention for sending pulses in a transmission channel, but it must not be considered as limiting the invention.

The following description considers transmission over a noisy channel of an ultra-wideband signal in the form of pulses.

The method used to generate and send this signal is M-PPM modulation, which sends a pulse every M time slots of a symbol time. A symbol corresponds to $\log_2(M)$ information bits.

The remainder of the description considers a symbol time that includes one frame carrying one pulse. An embodiment of the invention may equally be applied to a symbol time including a plurality of frames.

Figures 1, 2A:
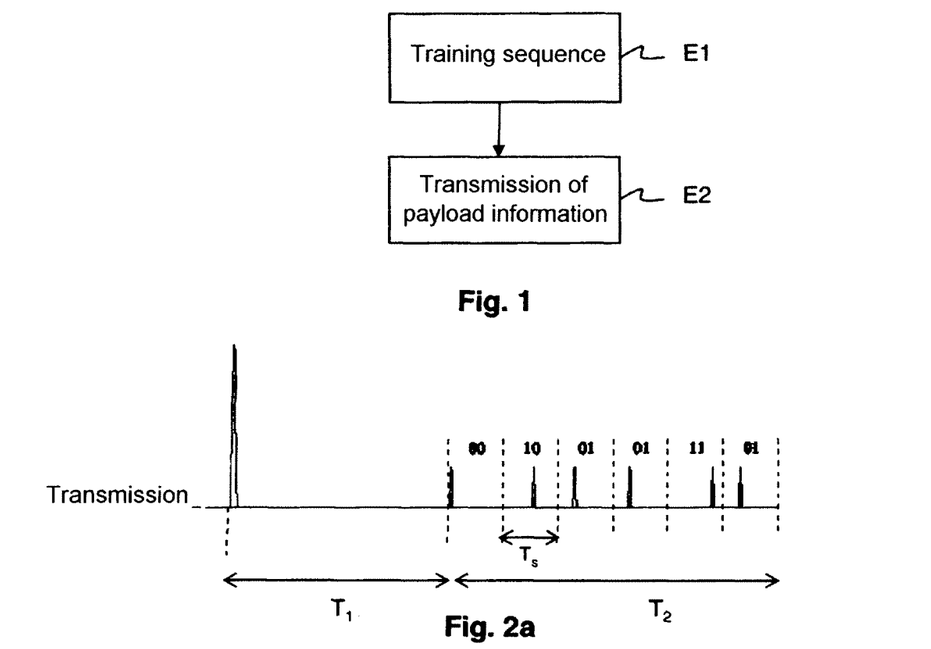
FIG. 1 shows a method of sending pulses in a transmission channel.
FIGS. 2a and 2b show training sequences of the invention respectively for sending and receiving.

FIG. 1 shows a method of sending pulses in a transmission channel.

The method includes a training step E1.

This training step E1 is carried out before sending payload information (step E2).

During the training step E1, particular information referred to as a training sequence is sent by a sender device via the transmission channel concerned to a receiver device equipped with a probabilistic equalizer.

The training sequence is known to the receiver device.

The training sequence comprises two parts $T_1$ and $T_2$.

The first part $T_1$ of the training sequence takes the form of at least one pulse of very high energy.

The energy sent in this part $T_1$ of the training sequence satisfies the maximum mean energy constraint with which a UWB signal must comply.

On sending, the energy of this pulse is greater than the energy of a pulse carrying payload information.

The M-PPM modulation used to generate this pulse is such that M is large. Thus the symbol time is made up of a large number of time slots. The number of time slots between sending this pulse and sending the next pulse is such that no interference is generated between the corresponding symbols.

Alternatively, the first part $T_1$ of the training sequence includes a plurality of pulses, each of very high energy. The number of time slots between sending two pulses is such that no interference is generated between the corresponding symbols, including the last pulse sent in the first part $T_1$ of the training sequence.

The second part $T_2$ of the training sequence takes the form of a succession of pulses known in advance and similar to those that carry payload information.

On sending, the energy of each of these pulses is equivalent to the energy of payload information.

The M-PPM modulation used to generate the set of pulses of the second part $T_2$ of the training sequence has a lower value of M than the M-PPM modulation used to generate the pulse or pulses of the first part $T_1$ of the training sequence, thus enabling intersymbol interference to be generated.

For this part $T_2$ of the training sequence, the number of pulses and consequently the number of corresponding symbols are such that a large amount of interference is generated.

Knowing this training sequence enables the receiver device to estimate the various possibilities of intersymbol interference.

Figure 2B:
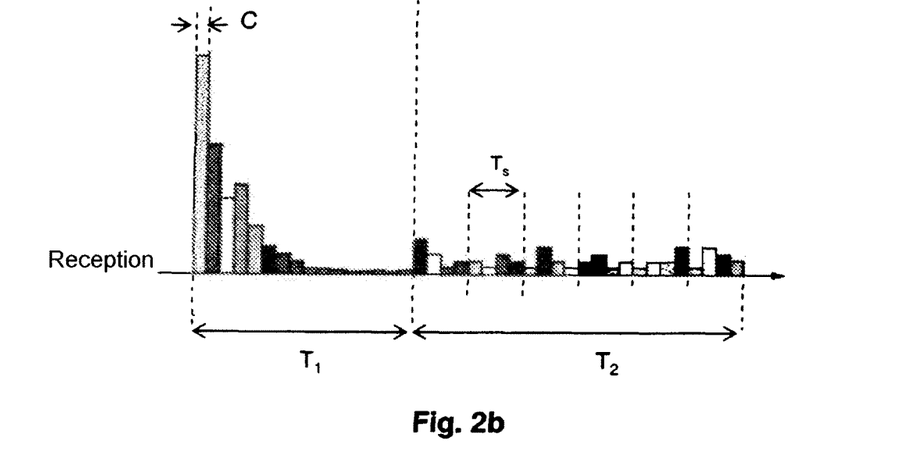

FIG. 2a and FIG. 2b show a training sequence as described above, respectively on sending and on receiving.

FIG. 2a shows a pulse of very high energy sent as part of the first part $T_1$ of the training sequence and a succession of pulses of lower energy than the preceding pulse sent as part of the second part $T_2$ of the training sequence.

FIG. 2b shows the energies received in the time slots C for each of the two parts $T_1$ and $T_2$ of the training sequence.

As mentioned in the description of the prior art, sending a signal at a high bit rate (of the order of a few tens of MHz, for example) over a dispersive channel (for example a CM4 channel) generates a large amount of intersymbol interference.

For example, FIGS. 3a, 3b, 3c, 3d, and 3e show the interference generated between symbols carried by a signal in the form of pulses sent at a high bit rate (100 Mb/s) in a transmission channel.

Figure 3A:
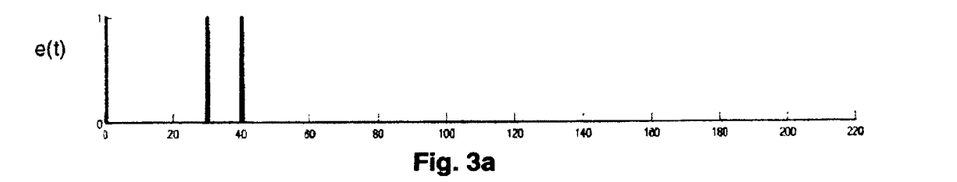
FIGS. 3a, 3b, 3c, 3d, and 3e show interference generated between symbols carried by a signal in the form of pulses transmitted at a high bit rate in a transmission channel.

FIG. 3a shows the signal e(t) sent in the form of pulses corresponding to the symbols 00, 10, and 00.

Figure 3B:
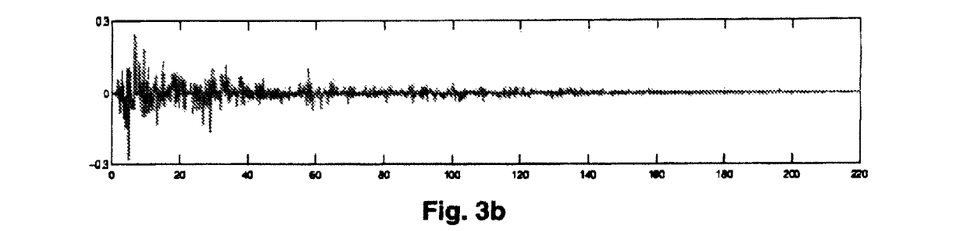
Figure 3C:
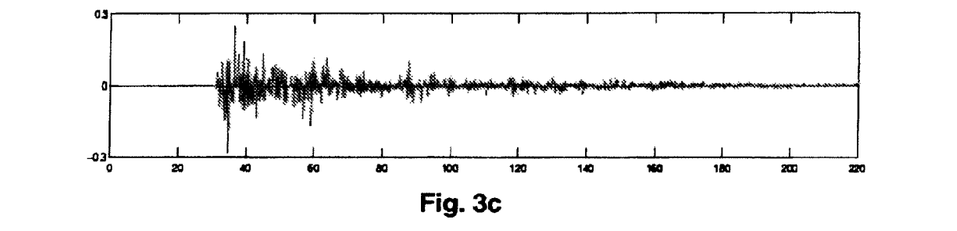
Figure 3D:
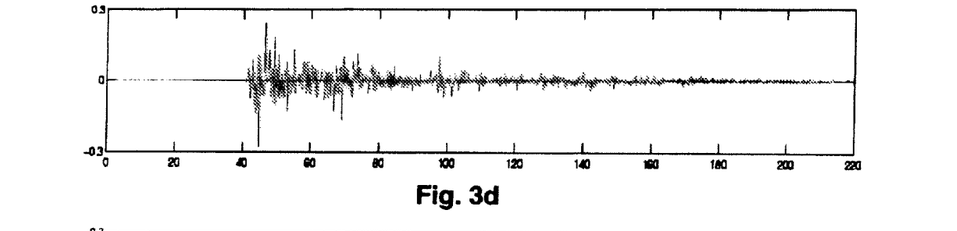

FIGS. 3b, 3c, and 3d respectively show the impulse responses of a channel CM4 for the symbols 00, 10, and 00.

Figure 3E:
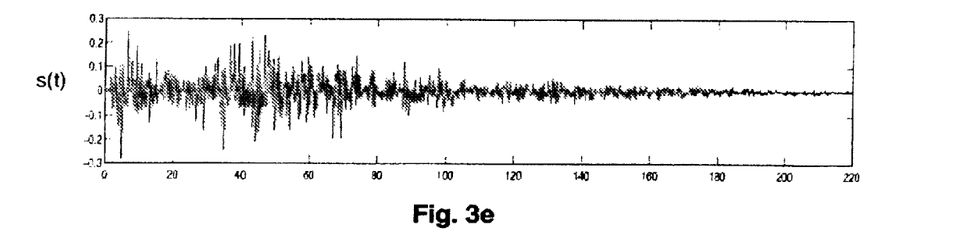

FIG. 3e shows the received signal s(t). This signal corresponds to the sum of the impulse responses of the channel.

The actual signal received also contains noise that is generally considered Gaussian white noise.

At 100 Mb/s the symbol time for 4-PPM modulation is 20 nanoseconds (ns), the duration of a time slot 5 ns, and the spreading time of the impulse response of the channel CM4 is 160 ns.

These durations are such that intersymbol interference is generated, which is illustrated in FIG. 3e by the received signal s(t).

As mentioned above, to alleviate this drawback it is necessary to use a receiver device provided with a probabilistic equalizer.

A receiver device is not able to manage an infinite number of symbols that interfere with one another. It is considered here that a receiver device manages K symbols that interfere with one another. For M-PPM modulation, the number P of time slots that may be affected by intersymbol interference is defined as follows:

$$P = M*(K-1)+1$$

where:
M corresponds to the type of M-PPM modulation concerned and may be equal to 2, 4, etc.; and
K corresponds to the number of symbols interfering with each other.

By convention, the expression interfering time slots refers to time slots that may be affected by intersymbol interference.

The number P also corresponds to the maximum number of potentially interfering time slots that the equalizer takes into account.

Using a probabilistic equalizer requires knowledge or an estimate of the parameters of the channel.

Those parameters include the number of symbols that might interfere with one another, the noise power spectral density, and the resultant energies of all possibilities of intersymbol interference.

On reception of each of the two parts $T_1$ and $T_2$ of the training sequence, the receiver device may carry out certain operations and estimate the parameters of the transmission channel.

Figure 4:
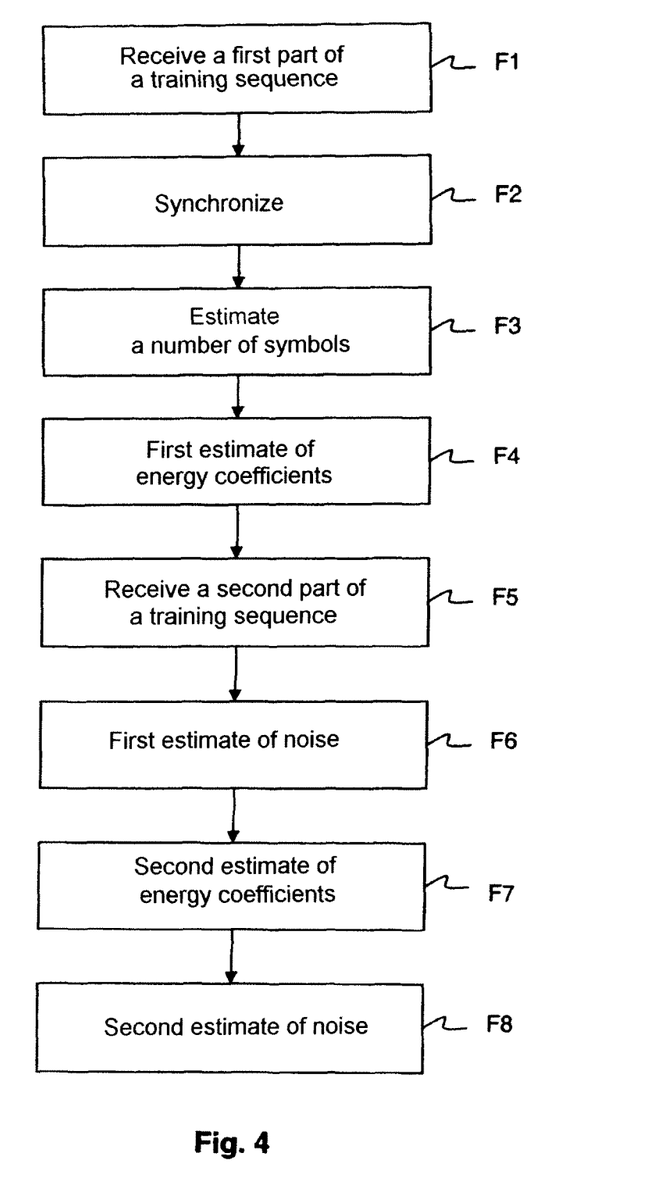
FIG. 4 shows a method of estimating parameters of a transmission channel for signals in the form of pulses.

FIG. 4 shows a method of estimating transmission channel parameters for signals in the form of pulses.

The step F1 of this method is a step of receiving the first part $T_1$ of the training sequence as described above.

The step F2 is a synchronization step.

The amplifier of a receiver device adjusts its amplification level as a function of the received signal.

The amplification gain is low when the receiver device is waiting for a message. This is the situation on reception of the first part $T_1$ of the training sequence.

The amplification gain is high when the receiver device is receiving a message. This is the situation while receiving the second part $T_2$ of the training sequence or during the step $E_2$ of receiving payload information, for example.

On reception of the first part $T_1$ of the training sequence, the receiver device may carry out an operation of synchronizing with the sender device.

Waiting for synchronization corresponds to waiting for a message, and the amplification gain is low to detect noise. Since the pulse of the first part $T_1$ of the training sequence is of very high energy, it is easily detectable and the synchronization operation is greatly facilitated.

The step F3 estimates the number of symbols that might interfere with one another.

The depth P of the channel expressed as a plurality of time slots may be measured by the receiver device.

Knowing the length of a time slot and observing the spreading of the impulse response of the channel, the receiver device deduces the depth P of the channel.

The receiver device may then deduce the number K of symbols that might interfere with one another.

The receiver device knows the duration of a time slot and the duration of a symbol time equal to M times the duration of a time slot. It also knows the depth P of the channel, and it is therefore able to deduce the number K of symbols that might interfere with one another from the formula given above:

$$P=M*(K-1)+1$$

Since the pulse (or the few pulses) of the first part $T_1$ are of very high energy, the receiver device easily detects all of the impulse response of the channel and the above measurements are therefore greatly facilitated.

The next step F4 is a first estimation of energy coefficients.

To comply with the mean energy per hertz of a UWB signal, the pulses of the training sequence are widely spaced apart.

Since the first part $T_1$ of the training sequence includes a single pulse or a few spaced-apart pulses, no interference is generated between the corresponding symbols. It is thus possible to estimate the energy coefficient $\beta_i$ of the signal for a given time slot i.

This estimate is deduced directly from the energy value given by the analog/digital converter of the receiver device.

Accordingly, where $\epsilon_i$ is the energy received in the $i^{th}$ time slot:

$$\beta_i=\epsilon_i$$

At this stage, it is also possible to produce a first estimate of the energy coefficients of the signal for two symbols that interfere with each other from the energy coefficients $\epsilon_i$ obtained without interference.

Considering two time slots i and j affected by the interference between two symbols, the corresponding energy coefficient is given by:

$$\beta_{ij}=\beta_i+\beta_j+\text{error}$$

The following table shows the combinations for two symbols $(x_n, x_{n-1})$ that interfere with each other (i.e. for K=2) in 4-PPM. The resulting symbol is a series of four energy coefficients $B_{ij}$. Thus there are 64 values of $B_{ij}$ for the 16 possible combinations, but only 15 interference levels $B_{ij}$ are different.

| | $x_n$ | | | | | | | | | | | | | | | |
|---|---|---|---|---|---|---|---|---|---|---|---|---|---|---|---|---|
| | 00 | | | | 01 | | | | 10 | | | | 11 | | | |
| $x_{n-1}$ | 1 | 0 | 0 | 0 | 0 | 1 | 0 | 0 | 0 | 0 | 1 | 0 | 0 | 0 | 0 | 1 |
| 00 | $\beta_{04}$ | $\beta_1$ | $\beta_2$ | $\beta_3$ | $\beta_4$ | $\beta_0$ | $\beta_1$ | $\beta_2$ | $\beta_4$ | 0 | $\beta_0$ | $\beta_1$ | $\beta_4$ | 0 | 0 | $\beta_0$ |
| 01 | $\beta_{03}$ | $\beta_{14}$ | $\beta_2$ | $\beta_3$ | $\beta_3$ | $\beta_{04}$ | $\beta_1$ | $\beta_2$ | $\beta_3$ | $\beta_4$ | $\beta_0$ | $\beta_1$ | $\beta_3$ | $\beta_4$ | 0 | $\beta_0$ |
| 10 | $\beta_{02}$ | $\beta_{13}$ | $\beta_{24}$ | $\beta_3$ | $\beta_2$ | $\beta_{03}$ | $\beta_{14}$ | $\beta_2$ | $\beta_2$ | $\beta_3$ | $\beta_{04}$ | $\beta_1$ | $\beta_2$ | $\beta_3$ | $\beta_4$ | $\beta_0$ |
| 11 | $\beta_{01}$ | $\beta_{12}$ | $\beta_{23}$ | $\beta_{34}$ | $\beta_1$ | $\beta_{02}$ | $\beta_{13}$ | $\beta_{24}$ | $\beta_1$ | $\beta_2$ | $\beta_{03}$ | $\beta_{14}$ | $\beta_1$ | $\beta_2$ | $\beta_3$ | $\beta_{04}$ |

The number of energy coefficients to be estimated without interference and with interference depends on the number K of symbols that might interfere with one another or the number P of corresponding time slots.

For example:
- for K equal to 2 (or P equal to 5), there are 15 energy coefficients to estimate;
- for K equal to 3 (or P equal to 9), there are 88 energy coefficients to estimate;
- for K equal to 4 (or P equal to 13), there are 424 energy coefficients to estimate.

Step F5 of the method of an embodiment of the invention of estimating parameters of a transmission channel is a step of receiving the second part $T_2$ of the training sequence as described above.

On reception of the second part $T_2$ of the training sequence, the receiver device may perform new operations or new estimations and refine the estimates produced on reception of the first part $T_1$ of the training sequence.

Accordingly, the step F6 is a first noise estimation.

On reception of the second part $T_2$ of the training sequence, a first transmission channel noise energy level is estimated.

Since the noise is considered as Gaussian white noise, this amounts to estimating the variance of the noise.

The variance $\sigma^2$ of the noise is estimated on the basis of the energy coefficients $\beta_{ij}$ of the signal estimated on reception of the first part $T_1$ of the training sequence.

A first estimate of the variance of the noise is given by the equation:

$$\sigma^2 = \frac{1}{(2L*M*N)} \sum_{n=1}^{N} \sum_{m=1}^{M} \sum_{\beta_{ij}} g(\varepsilon_{nm}, \beta_{ij}) p(B_{nm} = \beta_{ij})$$

where
2 L is the degree of freedom of the transmitted signal with 2 L=2*Ts*B, where Ts is the duration of a time slot and B is the width of the frequency band of the UWB signal;
M is the number of time slots per symbol time;
N is the number of symbols transmitted in the second part $T_2$ of the training sequence;
$\varepsilon_{nm}$ is the energy received in the time slot m of the symbol n;
$\beta_{nm}$ is the energy coefficient with interference corresponding to the time slot m of the symbol n;

$$g(\varepsilon_{nm}, \beta_{ij}) = \begin{cases} \varepsilon_{nm} - \beta_{ij} & \text{if } \varepsilon_{nm} > \beta_{ij} \\ 0 & \text{if } \varepsilon_{nm} \leq \beta_{ij}; \end{cases}$$

and $p(B_{nm}=\beta_{ij})=1$ if $B_{nm}=\beta_{ij}$ else $p(B_{nm}=\beta_{ij})=0$.

The next step F7 is a second energy coefficient estimation.

A second estimate of the energy coefficients with interference may be based on the first estimate $\beta'_{ij}$ obtained on reception of the first part $T_1$ of the training sequence and the first estimate of the variance of the noise.

This second estimate of the energy coefficients with interference is given by the equation:

$$\beta'_{ij} \approx \left( \frac{\sum_{n=1}^{N} \sum_{m=1}^{M} \sqrt{f(\varepsilon_{nm}, 2L\sigma^2)} * p(B_{nm} = \beta_{ij})}{\sum_{n=1}^{N} \sum_{m=1}^{M} p(B_{nm} = \beta_{ij})} \right)^2$$

where:
2 L is the degree of freedom of the transmitted signal with 2 L=2*Ts*B, where Ts is the duration of a time slot and B is the width of the frequency band of the UWB signal;
M is the number of time slots per symbol time;
N is the number of symbols transmitted in the second part $T_2$ of the training sequence;
$\varepsilon_{nm}$ is the energy received in the time slot m of the symbol n;
$\beta_{nm}$ is the energy coefficient with interference corresponding to the time slot m of the symbol n;

$p(B_{nm}=\beta_{ij})=1$ if $B_{nm}=\beta_{ij}$ else $p(B_{nm}=\beta_{ij})=0$; and $$f(\varepsilon_{nm}, 2L\sigma^2) = \begin{cases} \varepsilon_{nm} - 2L\sigma^2 & \text{if } \varepsilon_{nm} > 2L\sigma^2 \\ 0 & \text{if } \varepsilon_{nm} \leq 2L\sigma^2 \end{cases}$$

The next step F8 is a second noise estimation.

A second estimate $\sigma^{2'}$ of the variance of the noise is based on the second estimate $\beta'_{ij}$ of the energy coefficients with interference. This second estimate $\sigma^{2'}$ is obtained by replacing $\beta_{ij}$ by $\beta'_{ij}$ in the above equation for the variance of the noise.

Figure 5:
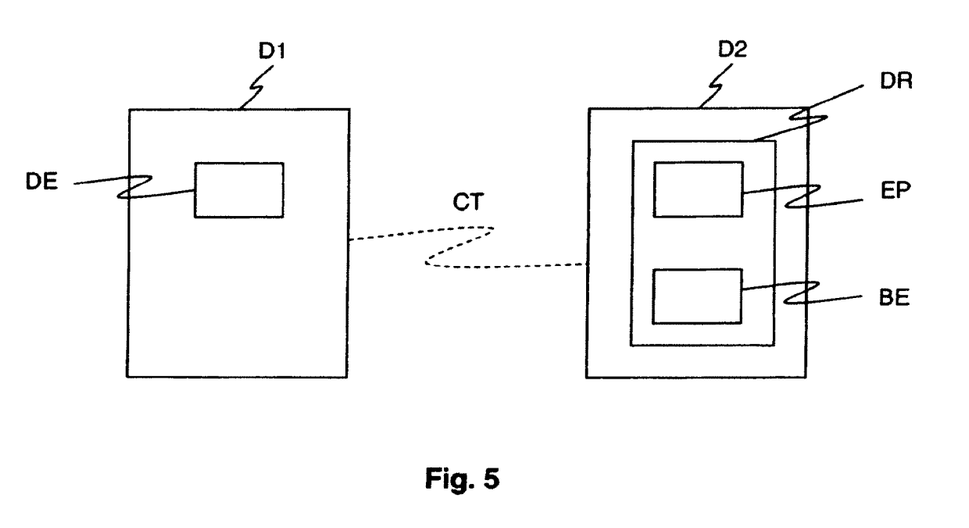
FIG. 5 shows a sender device and a receiver device.

FIG. 5 shows a sender device and a receiver device.

The sender device DE is inserted in a terminal D1.

This sender device DE includes means enabling it to send a training sequence including two parts $T_1$ and $T_2$ as described above before sending payload information.

The receiver device DR is inserted in a terminal D2.

The receiver device DR of the terminal D2 includes a probabilistic equalizer EP.

This receiver device DR is programmed so that it knows that it is going to receive a training sequence including two parts $T_1$ and $T_2$ as described above and of content that it knows.

When listening to the transmission channel CT, the amplification gain of the receiver device DR is low, so that it easily detects the first part $T_1$ of the training sequence.

On reception of the first part $T_1$ of the training sequence, the receiver device DR of the terminal D2 synchronizes with the sender device of the terminal D1.

The receiver device DR of the terminal D2 also includes an estimator unit BE able to process the training sequence with two parts $T_1$ and $T_2$.

On reception of the first part $T_1$ of the training sequence, the estimator unit BE estimates a number K of symbols that might interfere with one another and effects a first estimation of the energy coefficients as described above in steps F3 and F4.

On reception of the second part $T_2$ of the training sequence, the estimator unit BE effects first and second estimations of the energy level of the noise and a second energy coefficient estimation in steps F6, F8, and F7, respectively, as described above.

The estimator unit BE may be made up of one or more software modules forming a computer program. Thus an embodiment of the invention also relates to a computer program including software instructions by means of which the estimator unit BE executes some steps of the estimation method described above.

The software modules may be stored in or transmitted by a data medium. This may be a hardware storage medium, for example a compact disk read only memory (CD ROM), a magnetic diskette, or a hard disk, or a transmissible medium such as an electrical, optical or radio signal.

The terminals D1 and D2 implement applications requiring rapid transmission of information over short distances in a dispersive environment. Examples include fast downloading of data over a distance of a few meters between a mobile telephone and a computer in a room that may be a living room, an office, or a laboratory. The terminals D1 and D2 may therefore be a mobile telephone, a computer, a television, etc.

The quality of a method of estimating transmission channel parameters using a training sequence as described above has been validated by simulation.

The method of expressing the quality of such a method is based on the energy coefficient estimation error.

The conditions and the results of this experiment are set out below by way of illustration and must not be considered as limiting the invention.

A first part $T_1$ is considered of a training sequence that includes a single pulse spaced by 128 time slots from a second part $T_2$ of the same training sequence.

Bit rates of 25, 50, and 100 Mb/s are considered in 4-PPM modulation for four dispersive UWB channel models from CM1 (the least dispersive) to CM4 (the most dispersive).

The width of the frequency band of the UWB signal considered is 3 GHz.

Figure 6:
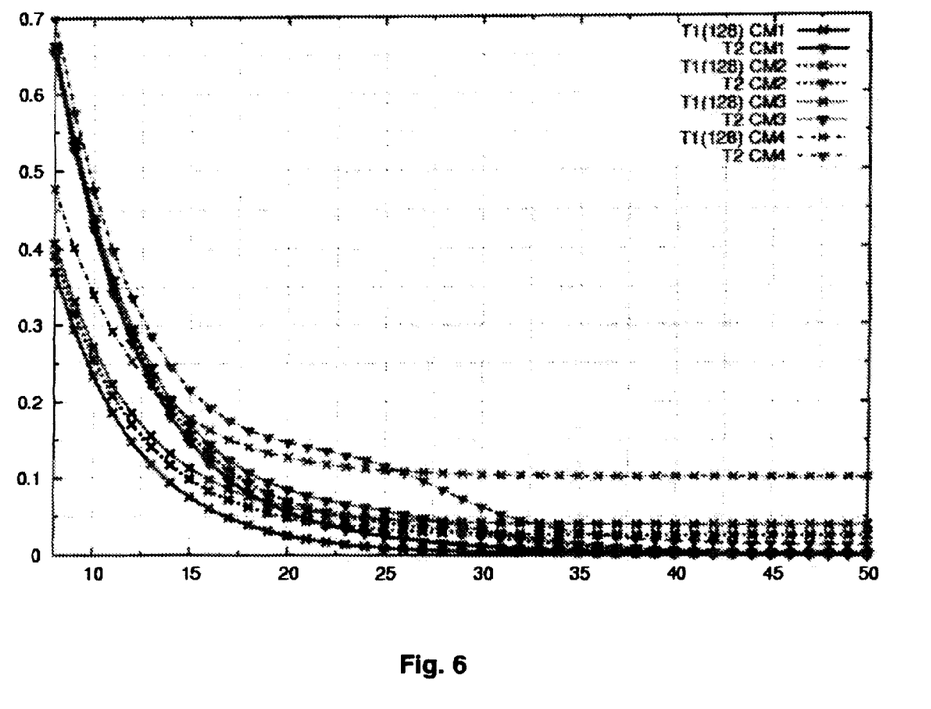
FIGS. 6, 7, and 8 show the results of simulating the quality of a method as shown in FIG. 4.
Figure 7:
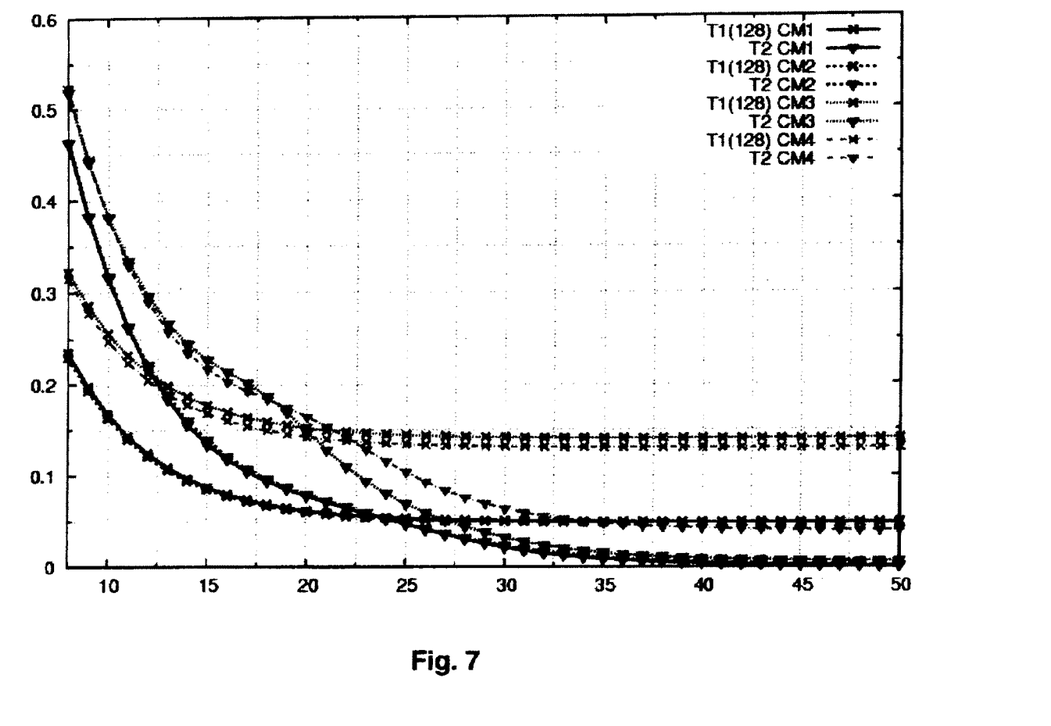
Figure 8:
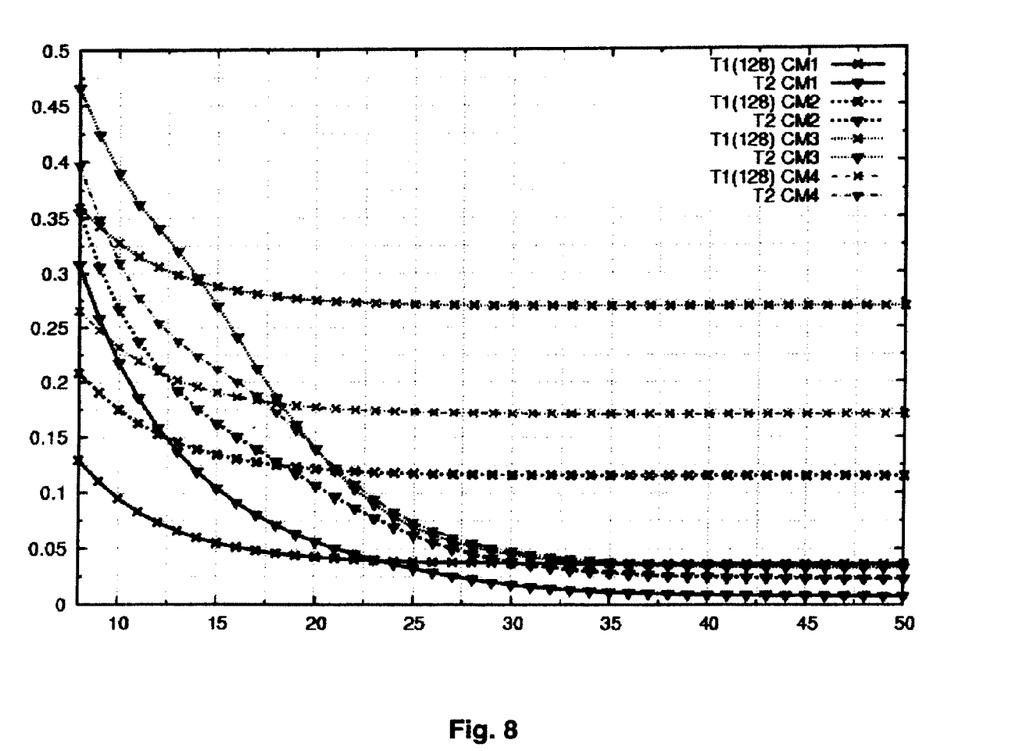

FIGS. 6, 7, and 8 show the results of simulating the quality of a method of estimating parameters of a transmission channel as described above.

FIGS. 4, 5, and 6 respectively show the mean error:

$$E[\beta_{ij}\text{estimated}-\beta_{ij}]$$

for bit rates of 25, 50, and 100 Mb/s, where E expresses the mathematical expectation.

The error is expressed in energy terms, with the energy of a pulse equal to 1.

The results show that the estimation error converges toward a very low value for the second part $T_2$ of the training sequence, especially when the channels are not too dispersive.

For the first part $T_1$ of the training sequence the convergence is asymptotic, which is explained by the approximation error:

$$\beta_{ij}=\beta_i+\beta_j+\text{error}.$$

If the signal-to-noise ratio is low, the energy coefficient estimation error is lower for the first part $T_1$ of the training sequence than for the second part $T_2$ of the training sequence. The opposite situation exists if the signal-to-noise ratio is high. This enables the receiver device to estimate the energy coefficients as a function of the noise level by considering the first part $T_1$ and/or the second part $T_2$ of the training sequence.

The parts of the training sequence thus operate in a complementary manner.

Although the present disclosure has been described with reference to one or more examples, workers skilled in the art will recognize that changes may be made in form and detail without departing from the scope of the disclosure and/or the appended claims.

The invention claimed is:

1. A method comprising:
sending pulses from a sender device to a receiver device in a transmission channel, wherein the pulses represent information symbols, with each of these pulses being associated with a time slot in a symbol time, and wherein sending includes a training step that is carried out before sending payload information and that includes sending an independent training sequence, wherein the training sequence is sent independently of the payload information and is made up of two parts:
a first part of the training sequence including at least one pulse of energy that is greater than the energy of a pulse carrying payload information, with there being a large number of time slots between the sending of said pulse and the sending of the next pulse; and
a second part of the training sequence including a set of pulses known in advance, which are similar to the pulses used for carrying payload information and generate intersymbol interference, the energy of each of these pulses in the second part being equivalent to the energy of a pulse carrying payload information.

2. The method according to claim 1, wherein the number of time slots between sending the at least one pulse of the first part of the training sequence and sending the next pulse is such that substantially no interference is generated between the corresponding symbols.

3. A method of estimating parameters of a transmission channel carrying pulses sent from a sender device to a receiver device, wherein the pulses represent information symbols, with each of these pulses being associated with a time slot in a symbol time, the method comprising:
receiving an independent training sequence by the receiving device before receiving payload information, with said training sequence being received independently of the payload information and being made up of two parts:
a first part of the training sequence including at least one pulse of energy that is greater than the energy of a pulse carrying payload information, with there being a large number of time slots between the sending of said pulse and the sending of the next pulse; and
a second part of the training sequence including a set of pulses known in advance, which are similar to the pulses used for carrying payload information and generate intersymbol interference, the energy of each of these pulses of the second part being equivalent to the energy of a pulse carrying payload information; and
estimating parameters of the transmission channel as a function of the training sequence.

4. The method according to claim 3, wherein the method includes, on reception of the first part of the training sequence, estimating a plurality of symbols that might interfere with one another.

5. The method according to claim 3, wherein the method includes, on reception of the first part of the training sequence, a first estimation of energy coefficients.

6. The method according to claim 3, wherein the method includes, on reception of the second part of the training sequence, a first estimation of an energy level of the noise of the transmission channel.

7. The method according to claim 3, wherein the method includes, on reception of the second part of the training sequence, a second estimation of energy coefficients.

8. A method according to claim 3, wherein the method includes a preliminary step of synchronizing the sender device and the receiver device, the receiver device having low amplification gain.

9. A device for sending pulses in a transmission channel, wherein the pulses represent information symbols, with each of these pulses being associated with a time slot in a symbol time, wherein the device comprises:
a non-transitory storage medium comprising instructions stored thereon; and
a computer configured by the instructions to:
send an independent training sequence before sending payload information, said training sequence being sent by the device independently of the payload information and being made up of two parts:
a first part of the training sequence including at least one pulse of energy that is greater than the energy of a pulse carrying payload information, with there being a large number of time slots between the sending of said pulse and the sending of the next pulse; and
a second part of the training sequence including a set of pulses known in advance, which are similar to the pulses used for carrying payload information and generate intersymbol interference, the energy of each of these pulses being equivalent to the energy of a pulse carrying payload information.

10. A terminal comprising the device as described in claim 9.

11. A device for receiving pulses provided with a probabilistic equalizer in a transmission channel, wherein the pulses represent information symbols, with each of these pulses being associated with a time slot in a symbol time, wherein the device comprises:

a non-transitory storage medium comprising instructions stored thereon; and
a computer configured by the instructions to:
receive an independent training sequence, wherein the training sequence is received independently of the payload information and is made up of two parts:
a first part of the training sequence including at least one pulse of energy that is greater than the energy of a pulse carrying payload information, with there being a large number of time slots between the sending of said pulse and the sending of the next pulse; and
a second part of the training sequence including a set of pulses known in advance, which are similar to the pulses used for carrying payload information and generate intersymbol interference, the energy of each of these pulses being equivalent to the energy of a pulse carrying payload information; and
estimate parameters of the transmission channel as a function of the training sequence.

12. A terminal comprising the device as described in claim 11.

13. A non-transitory storage medium comprising a computer program stored therein and including instructions for implementing a method of estimating parameters of a transmission channel carrying pulses sent from a sender device to a receiver device, when the method is executed by a computer, wherein the pulses represent information symbols, with each of these pulses being associated with a time slot in a symbol time, and wherein the method comprises:
receiving an independent training sequence by the receiving device before receiving payload information, with said training sequence being received independently of the payload information and made up of two parts:
a first part of the training sequence including at least one pulse of energy that is greater than the energy of a pulse carrying payload information, with there being a large number of time slots between the sending of said pulse and the sending of the next pulse; and
a second part of the training sequence including a set of pulses known in advance, which are similar to the pulses used for carrying payload information and generate intersymbol interference, the energy of each of these pulses of the second part being equivalent to the energy of a pulse carrying payload information; and
estimating parameters of the transmission channel as a function of the training sequence.

14. The method of claim 1, wherein the receiver device comprises an energy-detecting ultra-wideband receiver, and the transmission channel comprises a high-bit rate transmission channel.

15. The method of claim 3, wherein the receiver device comprises an energy-detecting ultra-wideband receiver, and the transmission channel comprises a high-bit rate transmission channel.

16. The device of claim 9, wherein the transmission channel comprises a high-bit rate transmission channel.

17. The device of claim 11, wherein the device comprises an energy-detecting ultra-wideband receiver, and the transmission channel comprises a high-bit rate transmission channel.

18. The non-transitory storage medium of claim 13, wherein the receiver device comprises an energy-detecting ultra-wideband receiver, and the transmission channel comprises a high-bit rate transmission channel.

* * * * *